(12) United States Patent
Liikanen et al.

(10) Patent No.: US 7,167,333 B1
(45) Date of Patent: Jan. 23, 2007

(54) METHOD AND APPARATUS FOR WRITING AND READING SERVO INFORMATION WRITTEN IN A SPIRAL FASHION

(75) Inventors: Bruce A. Liikanen, Berthoud, CO (US); Brian P. Rigney, Louisville, CO (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 10/126,917

(22) Filed: Apr. 19, 2002

Related U.S. Application Data

(63) Continuation-in-part of application No. 09/853,093, filed on May 9, 2001, now abandoned.

(60) Provisional application No. 60/285,055, filed on Apr. 19, 2001, provisional application No. 60/223,446, filed on Aug. 4, 2000, provisional application No. 60/203,159, filed on May 9, 2000.

(51) Int. Cl.
  *G11B 21/02* (2006.01)
(52) U.S. Cl. .......................................... 360/75; 360/48
(58) Field of Classification Search ................ 360/75, 360/78.06, 48, 78.04, 77.02, 51
  See application file for complete search history.

(56) References Cited

U.S. PATENT DOCUMENTS

| | | | |
|---|---|---|---|
| 4,157,577 A | 6/1979 | Porter, Jr. et al. | 360/77 |
| 4,587,579 A | 5/1986 | Cocke et al. | 360/75 |
| 5,003,412 A | 3/1991 | Bizjak et al. | 360/77.01 |
| 5,119,248 A | 6/1992 | Bizjak et al. | 360/75 |
| 5,164,863 A | 11/1992 | Janz | 360/57 |
| 5,519,546 A | 5/1996 | Lewis | 360/48 |
| 5,583,712 A | 12/1996 | Brunelle | 360/77.07 |
| 5,668,679 A * | 9/1997 | Swearingen et al. | 360/75 |
| 5,793,559 A | 8/1998 | Shepherd et al. | 360/78.09 |
| 6,084,738 A | 7/2000 | Duffy | 360/75 |
| 6,091,564 A * | 7/2000 | Codilian et al. | 360/75 |
| 6,144,517 A | 11/2000 | Watanabe et al. | 360/77.04 |
| 6,388,833 B1 | 5/2002 | Golowka et al. | 360/77.02 |
| 6,476,995 B1 | 11/2002 | Liu et al. | 360/75 |
| 6,507,450 B1 * | 1/2003 | Elliott | 360/77.08 |
| 6,587,293 B1 | 7/2003 | Ding et al. | 360/51 |
| 6,674,593 B2 | 1/2004 | Jolly et al. | 360/51 |
| 6,714,376 B1 | 3/2004 | Brunnett et al. | 360/75 |
| 6,937,420 B1 | 8/2005 | McNab et al. | 360/75 |
| 6,943,978 B1 | 9/2005 | Lee | 360/75 |

* cited by examiner

*Primary Examiner*—Andrew L. Sniezek
(74) *Attorney, Agent, or Firm*—Tejpal S. Hansra

(57) ABSTRACT

A method and apparatus for writing spiral servo information onto one or more disk surfaces at a variable velocity using a servo track writer (STW) is provided. In one embodiment, a variable velocity profile is chosen so that spiral crossing angles across the disk surface are set to be equal. In another embodiment, a variable velocity profile is chosen so that spiral crossing angles across groups of tracks (i.e., two or more tracks) are set to be equal. In yet another embodiment, a variable velocity profile is chosen to adjust the number of tracks per inch (TPI) across the disk surface.

43 Claims, 16 Drawing Sheets

METHOD AND APPARATUS FOR WRITING AND READING SERVO INFORMATION WRITTEN IN A SPIRAL FASHION

CROSS-REFERENCE TO RELATED APPLICATIONS

Priority is claimed from U.S. Provisional Patent Application Ser. No. 60/285,055 filed Apr. 19, 2001, which is incorporated by reference herein in its entirety. This is a continuation-in-part of U.S. patent application Ser. No. 09/853,093 now abandoned, filed May 9, 2001, which claims priority from U.S. Provisional Patent Application Ser. No. 60/203,159 filed May 9, 2000, U.S. Provisional Patent Application Ser. No. 60/223,446 filed Aug. 4, 2000, and U.S. Provisional Patent Application Ser. No. 60/285,055 filed Apr. 19, 2001. All of the aforementioned patent applications are specifically incorporated herein by reference in their entireties.

INCORPORATION BY REFERENCE

U.S. patent application Ser. No. 09/923,570 filed Aug. 6, 2001 is specifically incorporated herein by reference in its entirety.

FIELD OF THE INVENTION

The present invention relates to computer disk drives. More particularly, the present invention relates to writing servo information onto and reading servo information from one or more disk surfaces of a disk drive, wherein the servo information is written in a spiral fashion.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 (having a write head and a read head) mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 31. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

FIG. 2 is a functional block diagram which illustrates a conventional disk drive 10 that is coupled to a host computer 32 via an input/output port 34. The disk drive 10 is used by the host computer 32 as a data storage device. The host 32 delivers data access requests to the disk drive 10 via port 34. In addition, port 34 is used to transfer customer data between the disk drive 10 and the host 32 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$ in response to, among other things, an access command received from the host computer 32 via the interface 40.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 32 into a write current signal that is delivered to the transducer 20 to "write" the customer data to an appropriate portion of the disk 12. As will be discussed in greater detail, the read/write channel 38 is also operative for continually processing data read from servo information stored on the disk 12 and delivering the processed data to the controller 36 for use in, for example, transducer positioning.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 that each cross all of the tracks 42 on the disk 12. The servo information in the servo spokes 44 is read by the transducer 20 during disk drive operation for use in positioning the transducer 20 above a desired track 42 of the disk 12. The portions of the track between servo spokes 44 have traditionally been used to store customer data received from, for example, the host computer 32 and are thus referred to herein as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of writing servo information on the disk surface with a high degree of positional accuracy. In general, a STW is a very expensive piece of capital equipment. Thus, it is generally desirable that a STW be used as efficiently as possible during manufacturing operations. Even a small reduction in the amount of data needed to be written by the STW per disk surface can result in a significant cost and time savings.

FIG. 4 depicts, in block diagram form, certain portions of a conventional servo track writer 50 and a disk drive 10. Only those components that are used to position the disk drive's actuator arm assembly 18 radially relative to the center of the disk surface are shown in FIG. 4. Among other things, the servo track writer 50 includes an STW digital signal processor (DSP) 52, a STW voice-coil motor (VCM) 54, a STW actuator arm assembly 56 and a push-pin system 58.

In order to write servo information on to a disk surface 12, the disk drive 10 is loaded onto the STW 50 and is held securely in place. One of a variety of push-pin systems 58 (e.g., a mechanical push-pin system or an optical push-pin system) is used to create an interface between the actuator arm assembly 18 of disk drive 10 and the actuator arm assembly 56 of the servo track writer 50. By properly positioning the STW actuator arm assembly 56, the actuator arm assembly 18 and, hence, the transducer 20 of the disk drive 10 may be positioned at an appropriate location relative to the center of the disk surface 12. In order to effectuate this positioning, the STW 50 uses a servo loop formed by an external relative encoder (see block 70 in FIG. 6), which cooperates with (or forms a part of) the STW VCM 54, and a compensation circuit (see block 70 in FIG. 6).

Once the transducer 20 is appropriately positioned relative to the disk surface 12, servo information is then written by the transducer 20 onto the disk surface 12 at the particular radial location. Subsequently, the STW actuator arm assembly 56 is used to position the actuator arm assembly 18 of the disk drive 10 at a next radial location and servo information is written at this radial location. The process repeats until servo information is written at all predetermined radial locations across the disk surface 12.

As shown in FIG. 4, the STW 50 also includes a crystal 60 and a divide-by-N circuit 62 which are used to provide a series of interrupt signals 64 (see FIG. 5) to the STW DSP 52 at predetermined sample times, $T_s$. Upon receipt of an interrupt signal 64, the STW DSP 52 performs an interrupt service routine (ISR) 66, which last for a duration generally less than the sample time, $T_s$, as indicated by the brackets shown in FIG. 5.

FIG. 6 depicts, in block diagram form, the steps of a conventional interrupt service routine. As shown in FIG. 6, the ISR broadly includes the steps of: profile generation (block 68), STW servo loop closure, whereby the generated profile is followed (block 70), and communication/housekeeping between the host computer 32 and the STW DSP 52 (block 72).

Because servo information is currently written by placing transducers at radial locations across the disk surface and then writing servo information which is used to define a track, the time for writing servo information increases as the total number of tracks able to be placed on a disk surface increases. Since the number of tracks per inch (TPI) continues to increase, manufacturing times are likely to continue to increase, unless more servo track writers are supplied. However, as alluded to above, the purchase of additional servo track writers involves a significant capital expense.

In order to solve this problem and to expedite the manner by which servo information is written onto a disk surface (among other things), it has been determined that it would be beneficial to write servo information in spiral patterns. U.S. patent application Ser. No. 09/853,093 filed May 9, 2001 and U.S. patent application Ser. No. 09/923,570 filed on Aug. 6, 2001, both of which are incorporated herein by reference in their entireties, relate to writing servo information in spiral patterns.

In such applications, among other things, reference is made to writing spiral servo patterns at a constant velocity by following a constant velocity profile. However, writing spiral servo patterns at a constant velocity may require certain tradeoffs. Accordingly, it would be desirable to write spiral servo patterns at a variable velocity, as an alternative to writing spiral patterns at a constant velocity, to capitalize on benefits gained therefrom.

SUMMARY OF THE INVENTION

The present invention is designed to meet the aforementioned, and other, needs. The invention is directed to a method and apparatus for writing spiral servo information onto one or more disk surfaces at a variable velocity using a servo track writer (STW). In one embodiment, a variable velocity profile is chosen so that spiral crossing angles across the disk surface are set to be equal. In another embodiment, a variable velocity profile is chosen so that spiral crossing angles across groups of tracks (i.e., two or more tracks) are set to be equal. In yet another embodiment, a variable velocity profile is chosen to adjust the number of tracks per inch (TPI) across the disk surface.

Other embodiments, objects, features and advantages of the invention will be apparent from the following specification taken in conjunction with the following drawings.

DETAILED DESCRIPTION OF THE PREFERRED EMBODIMENT

Figure 1:
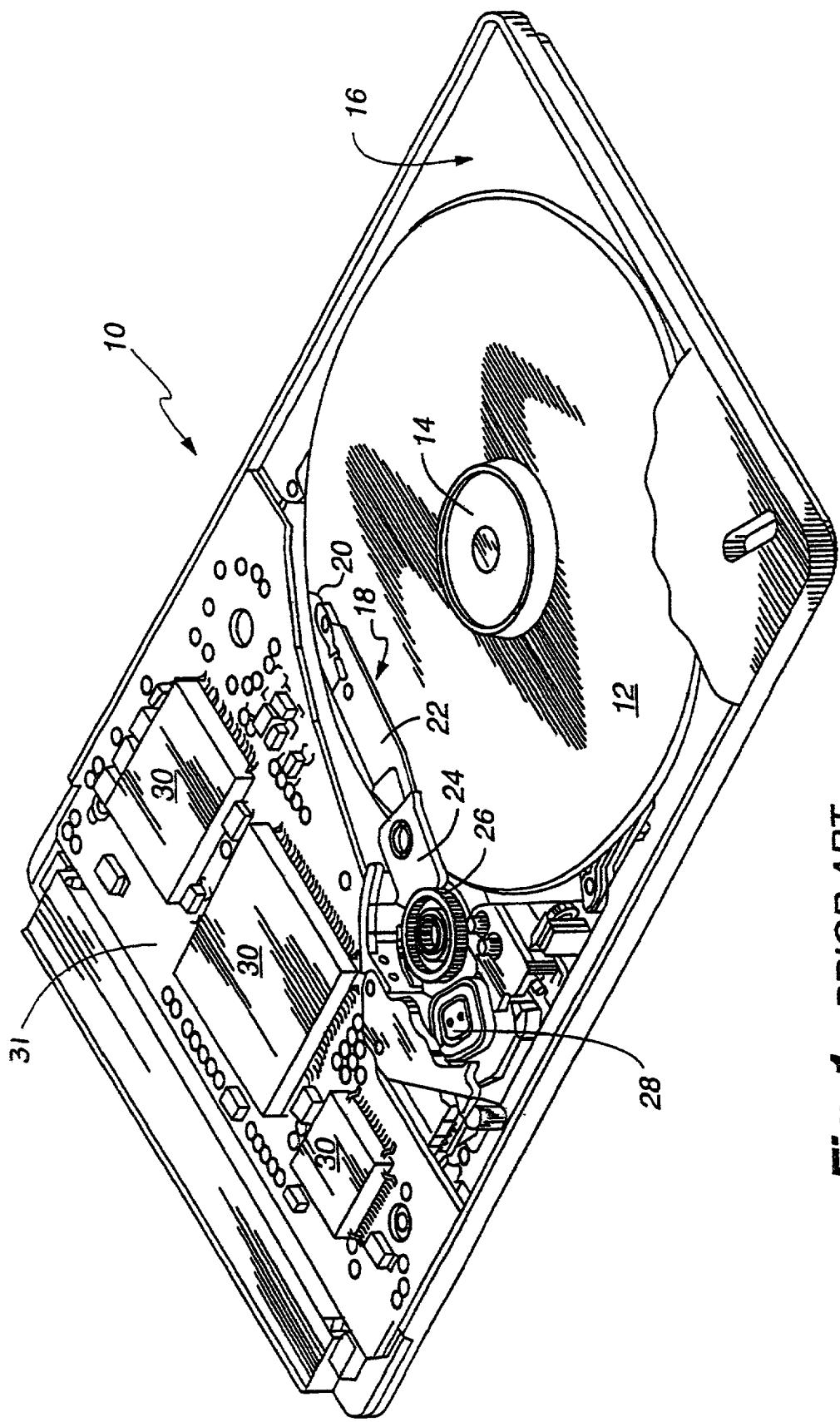
FIG. 1 is a diagrammatic representation illustrating a conventional disk drive with its top cover removed.
Figure 2:
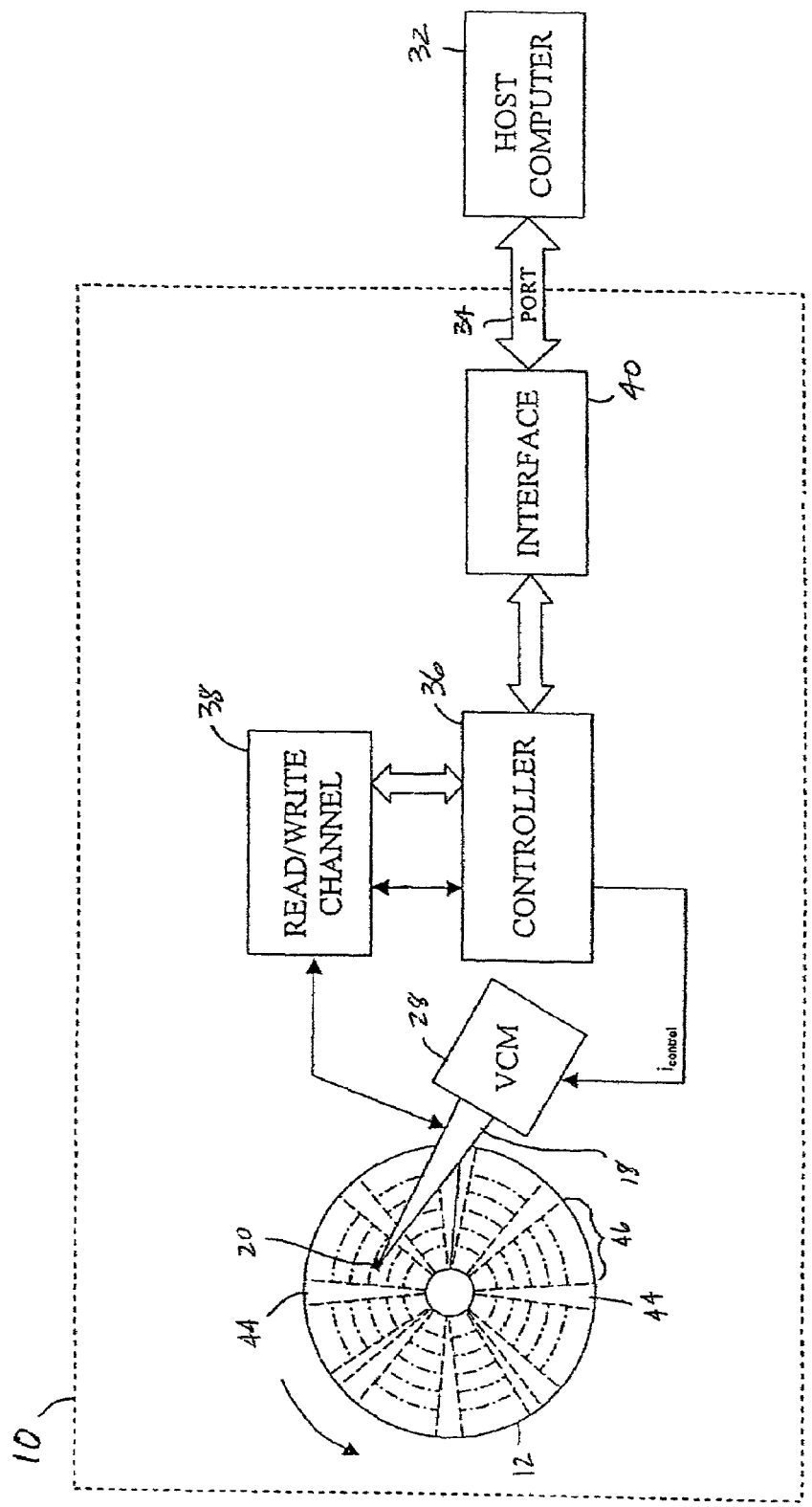
FIG. 2 is a functional block diagram which illustrates a conventional disk drive that is coupled to a host computer via an input/output port.
Figure 3:
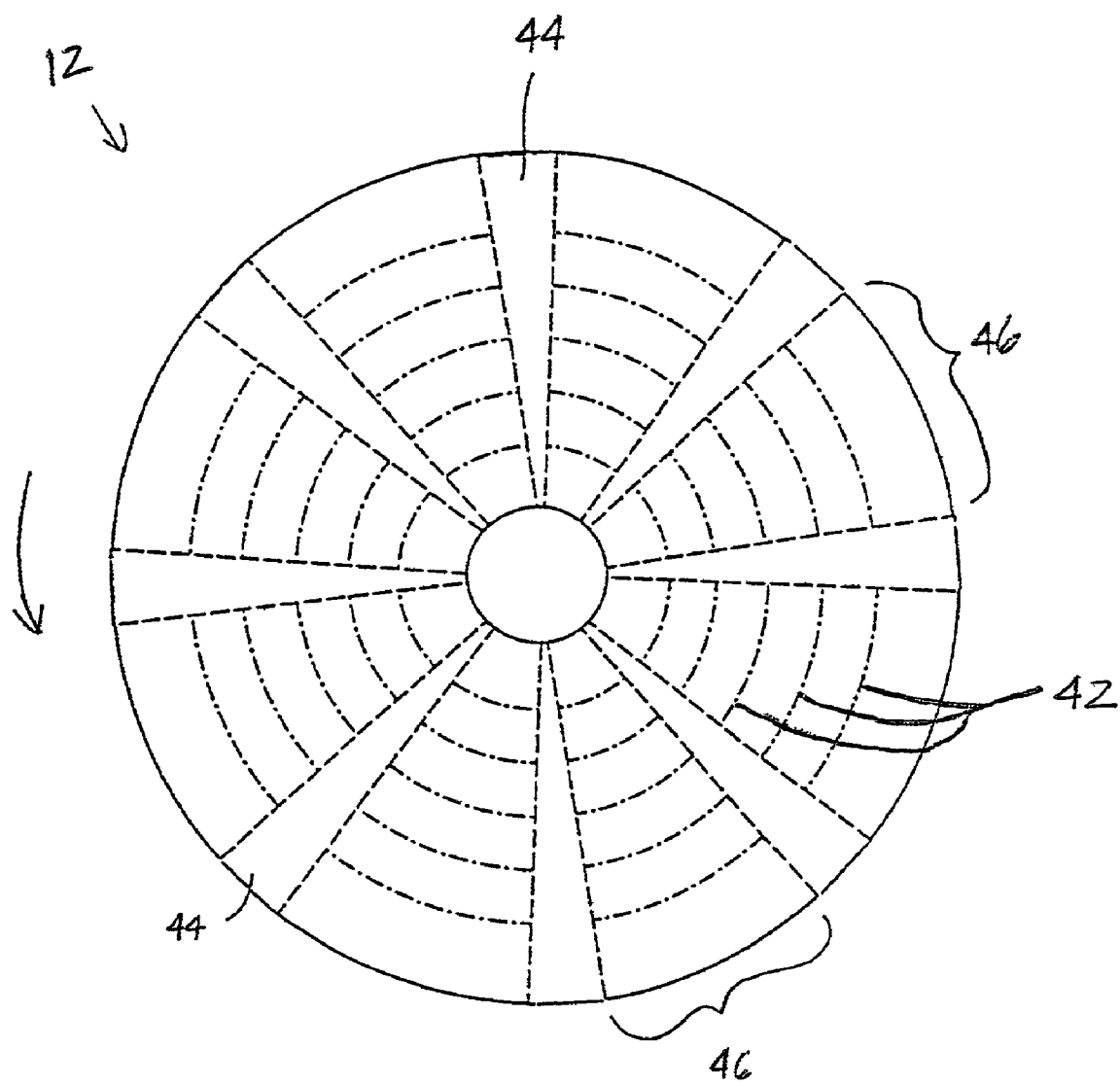
FIG. 3 is a diagrammatic representation of a top view of a magnetic storage disk illustrating a typical organization of data on the surface of the disk.
Figure 4:
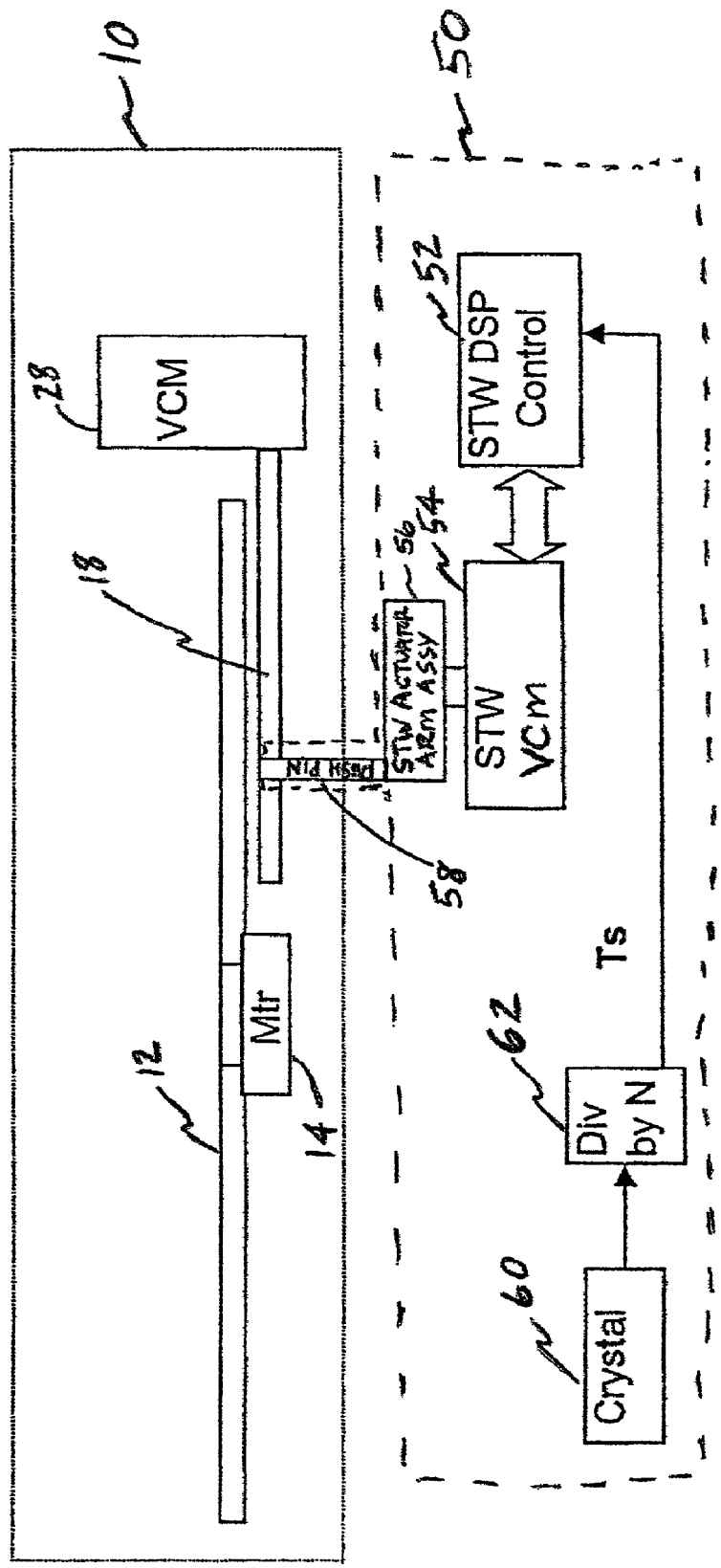
FIG. 4 is a block diagram illustrating portions of a conventional servo track writer (STW)
Figure 5:
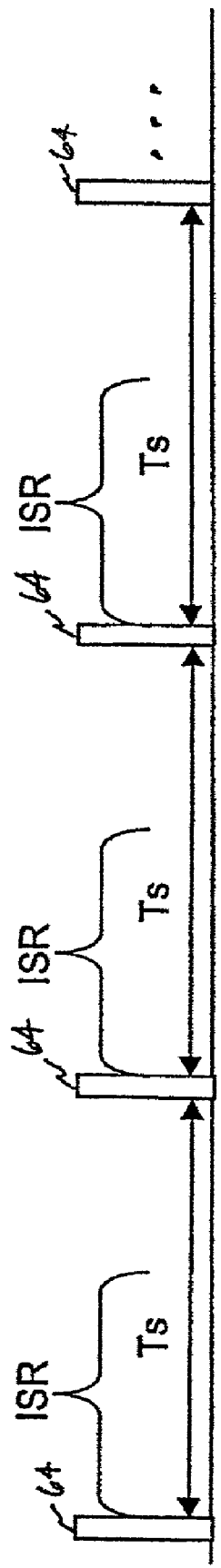
FIG. 5 is a diagrammatic representation illustrating a series of interrupt signals which occur at predetermined sample times, $T_s$.
Figure 6:
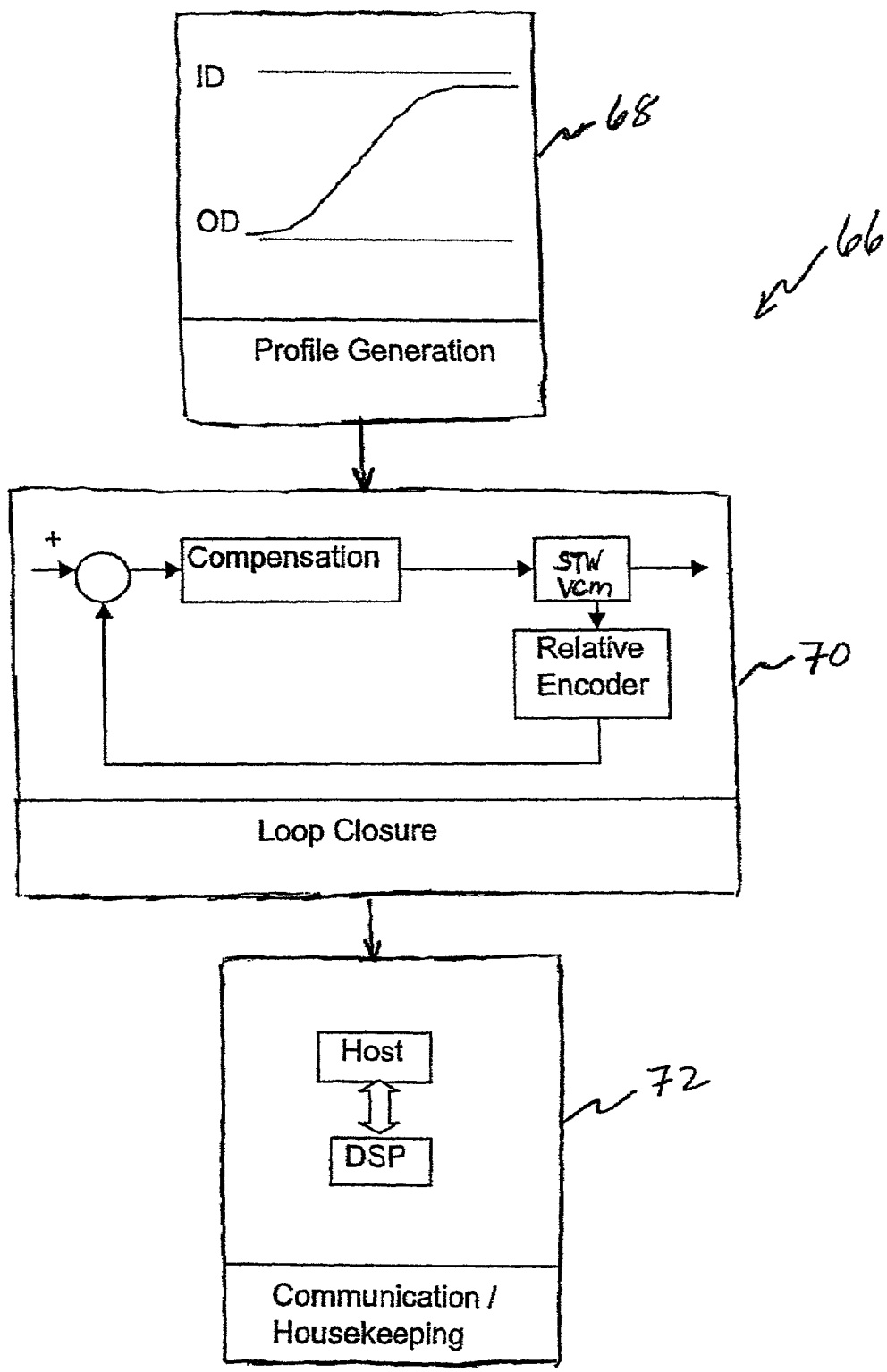
FIG. 6 is a block diagram illustrating a conventional interrupt service routine.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 7:
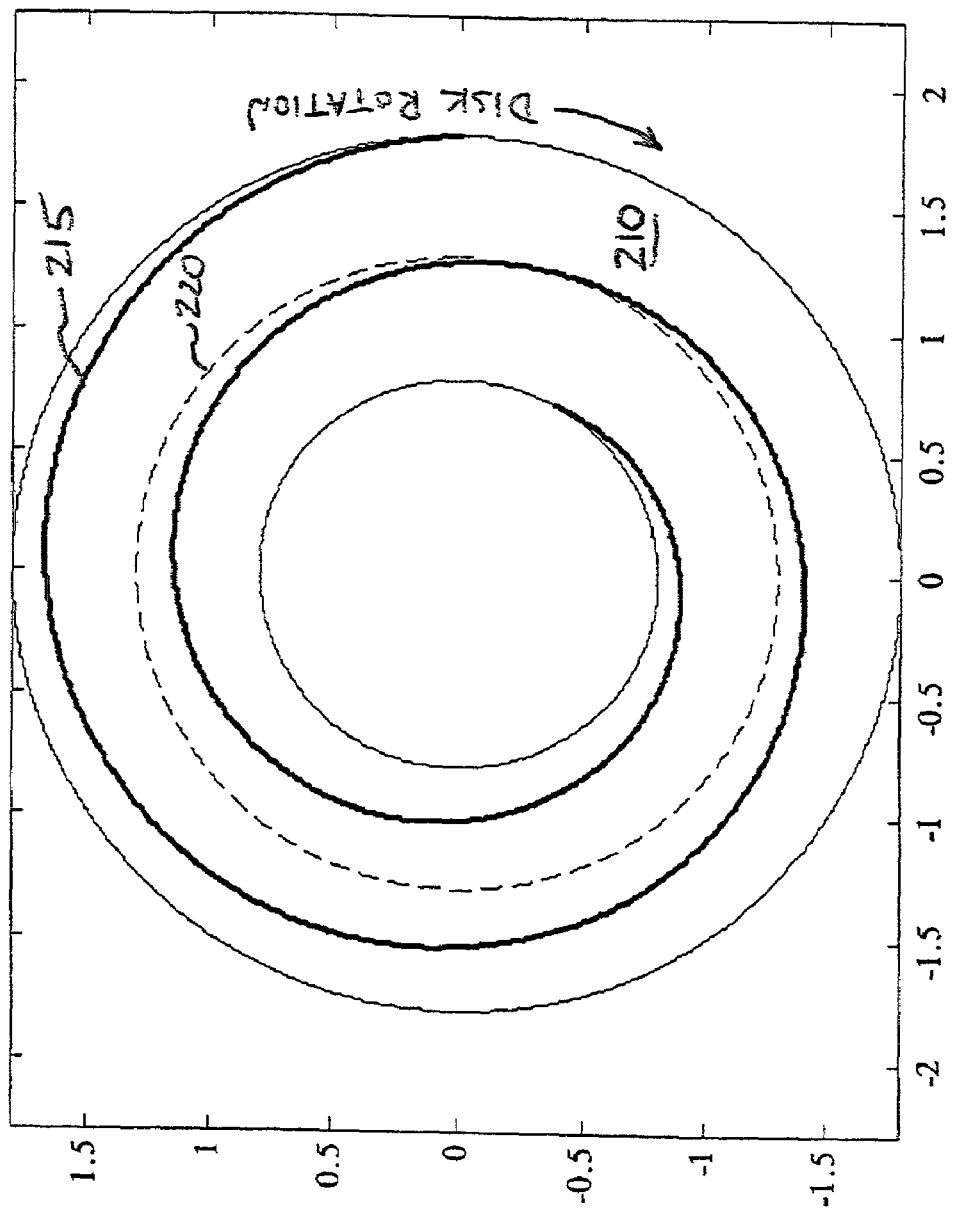
FIG. 7 is a diagrammatic representation of a disk surface having a first spiral of servo information written thereon.

FIG. 7 is a diagrammatic representation of a disk surface 210 having a first spiral of servo information 215 written thereon in accordance with the present invention. The dashed line, identified by reference numeral 220, represents a track. The first spiral of servo information 215 may make multiple revolutions around the disk surface 210 (roughly two revolutions as shown in FIG. 7), but only crosses track 220 once.

Figure 8:
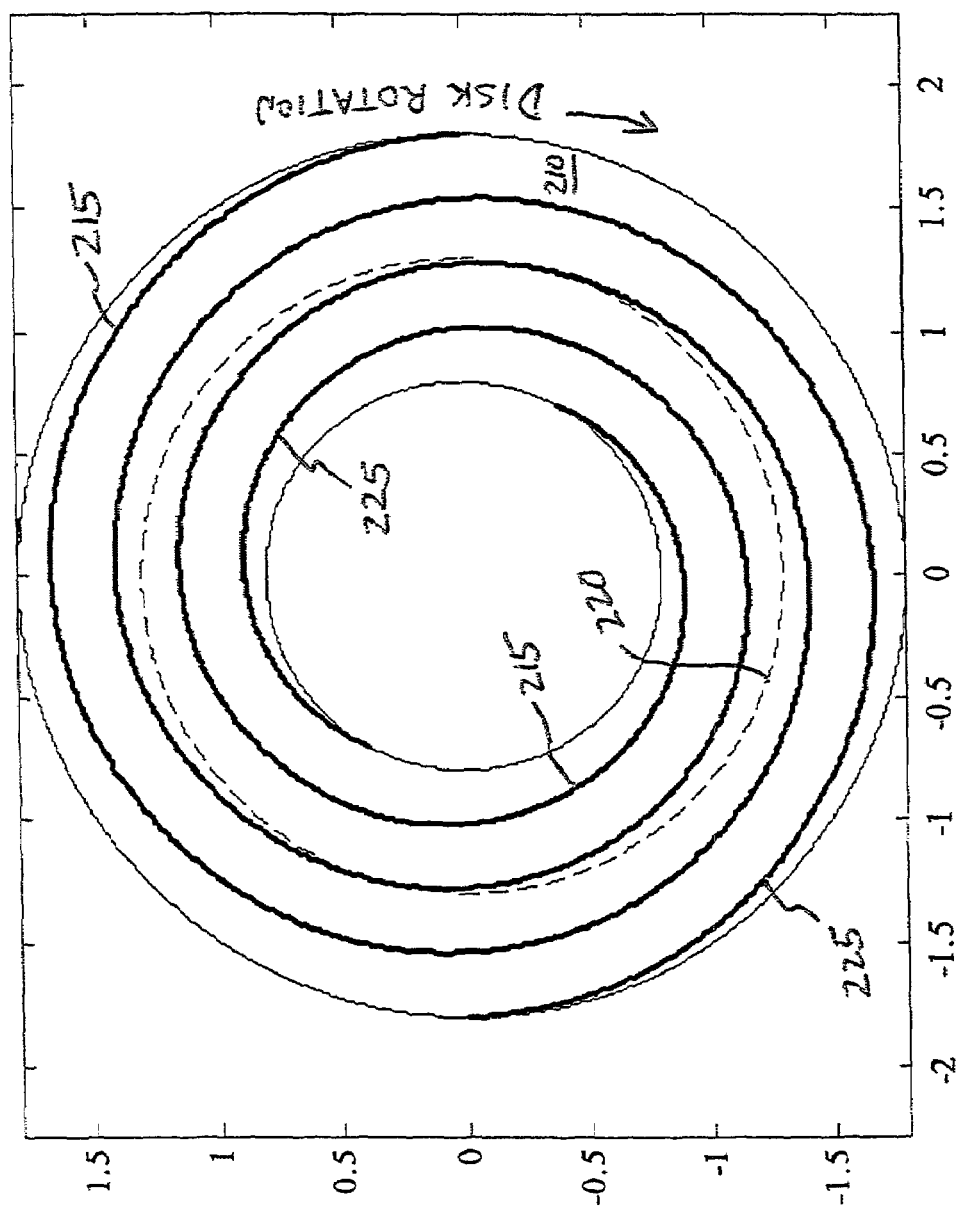
FIG. 8 is a diagrammatic representation of a disk surface having a first spiral of servo information and a second spiral of servo information written thereon.

FIG. 8 is a diagrammatic representation of a disk surface 210 having a first spiral of servo information 215 and a second spiral of servo information 225 written thereon. As shown in FIG. 8, the first and second spirals 215, 225 are interlaced with one another and are written 180 degrees apart. Again, each spiral crosses track 220 only once.

Additional spirals of servo information may be written on the disk surface 210 depending upon the servo sample rate (that is, the number of servo samples required for each track 220 to keep the disk drive's transducer on-track). For example, if a servo sample rate of 120 equally-spaced servo sectors per track was required, 120 equally-spaced spirals would be written on the disk surface 110. Accordingly, by using the present technique, the time necessary to write servo information on disk surface 110 is a function of the servo sample rate (i.e., the number of spirals of servo information to be written) rather than the number of tracks.

Figure 9:
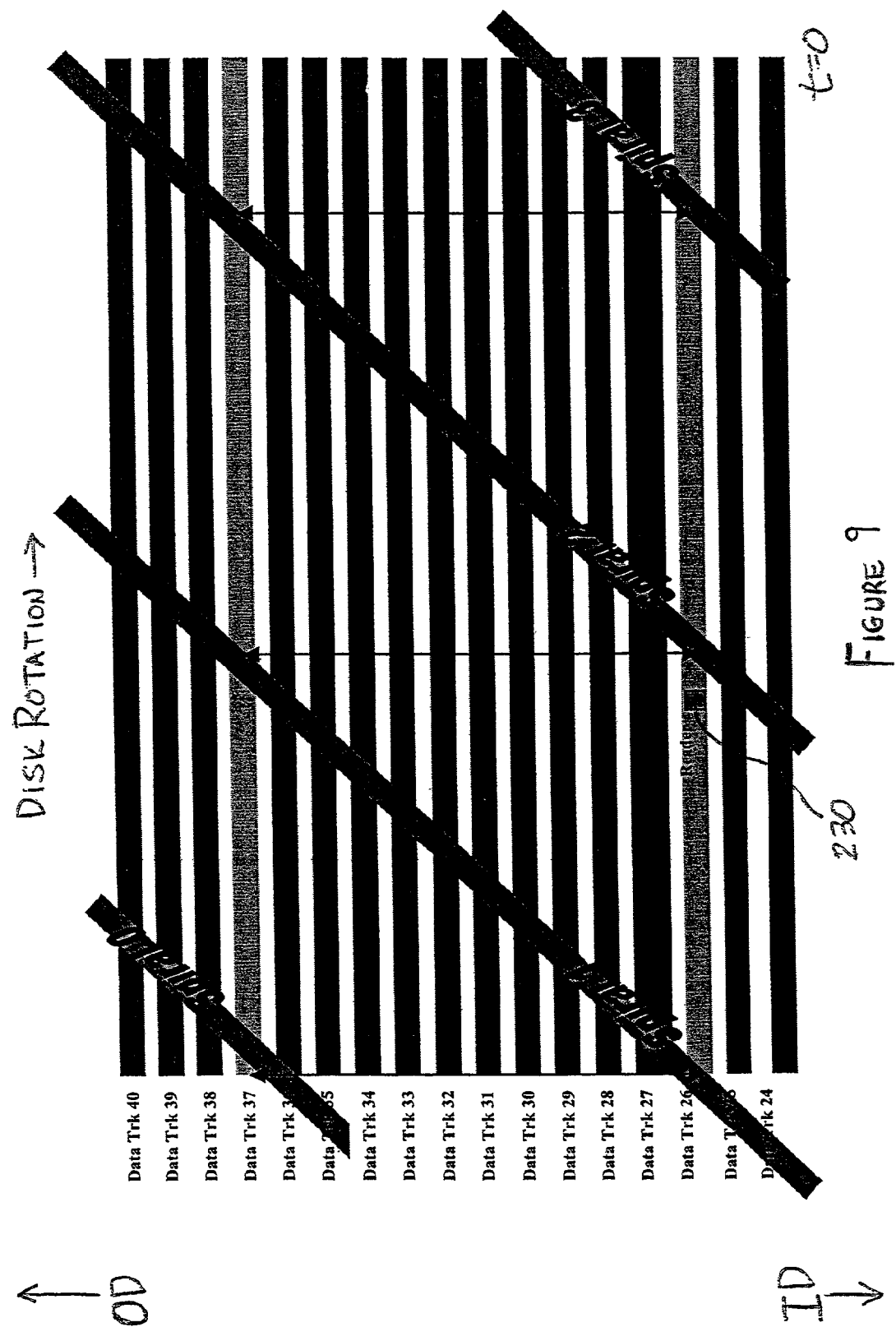
FIG. 9 is a diagrammatic representation of a magnified view of a portion of FIG. 8 showing additional spirals of servo information.

FIG. 9 is a diagrammatic representation of a magnified view of a portion of FIG. 8 showing additional spirals of servo information (i.e., portions of four spirals are shown in FIG. 9). Furthermore, FIG. 9 is shown in a linear, instead of arcuate fashion, for ease of depiction.

At any given track 220 (Data Tracks 24-40 are depicted in FIG. 9), the disk drive's read head 230 (also referred to herein as the reader) will cross over the spirals of servo information at intervals equal to the sample rate. Furthermore, the read head 230 will cross over the spirals of servo information at an angle. Additionally, the number of spirals of servo information that cross each of the tracks 220 will be equivalent. For a given track 220, the spacing between adjacent spirals of servo information will be approximately equidistant.

It should be noted that a read head 230 placed on a track 220 closer to the inner diameter (ID) of the disk surface 210 will cross a given spiral of servo information at a time slightly delayed from a track 220 closer to the outer diameter (OD) of the disk surface. For example, suppose that: (1) time zero (t=0) is defined towards the right side of FIG. 9; (2) time increases in the figure from right to left along the horizontal; and, (3) the disk is rotating in the direction indicated by corresponding arrow shown in FIG. 9. If the read head 230 was placed on Data Track 26 at time zero and the disk was rotated, the read head 230 would cross Spiral 2 at a point later in time than if the read head 230 was placed on Data Track 37 under similar conditions, since Data Track 26 is closer to the inner diameter than Data Track 37.

Referring again to FIGS. 7 and 8, the spirals of servo information are written by moving the STW actuator arm in a generally radial direction (more accurately, in a radial direction along an arc), while both the disk is spinning and the transducer is enabled. The direction of disk rotation is indicated by an arrow as shown in each of FIGS. 7 and 8.

In FIGS. 7 and 8, the transducer is presumed to start at or near the outer diameter of the disk surface and is moved in a generally radial direction towards the inner diameter of the disk surface. It should be noted, however, that the transducer may start writing at or near the inner diameter of the disk surface and be moved in a generally radial direction towards the outer diameter of the disk surface.

The transducer is preferably enabled for its entire stroke (i.e., from OD to ID or visa-versa). As a result, a continuous spiral of servo information is written.

As described in U.S. patent application Ser. No. 09/853, 093 filed May 9, 2001, each of the spirals of servo information include sync marks written at fixed time intervals by the transducer. Furthermore, the transducer is moved at some fixed velocity in a generally radial direction across the disk surface. If the time intervals between sync marks is known and the velocity of the transducer is known, the distance between sync marks along a spiral can be determined. Specifically, the following formula may be applied: Distance=(Velocity)(Time), where Distance represents the distance between sync marks, Velocity represents the velocity of the transducer and Time represents the interval between sync marks.

For example, the interval between sync marks may be set at 1 microsecond, while the transducer may be controlled to move at a velocity of 10 inches per second along its stroke. Thus, the distance between sync marks can be calculated to be 10 microinches along each spiral.

Each sync mark along a given spiral corresponds to unique radius. Accordingly, the sync marks may be used to accurately position a transducer of a disk drive over the disk surface.

It should be noted that, as an alternative to writing sync marks relative to a fixed time interval, sync marks may be written at some fixed distance interval by the transducer. If the transducer was moved at a fixed velocity when writing a spiral, the above formula could be applied to determine a time interval between sync marks.

Figure 10:
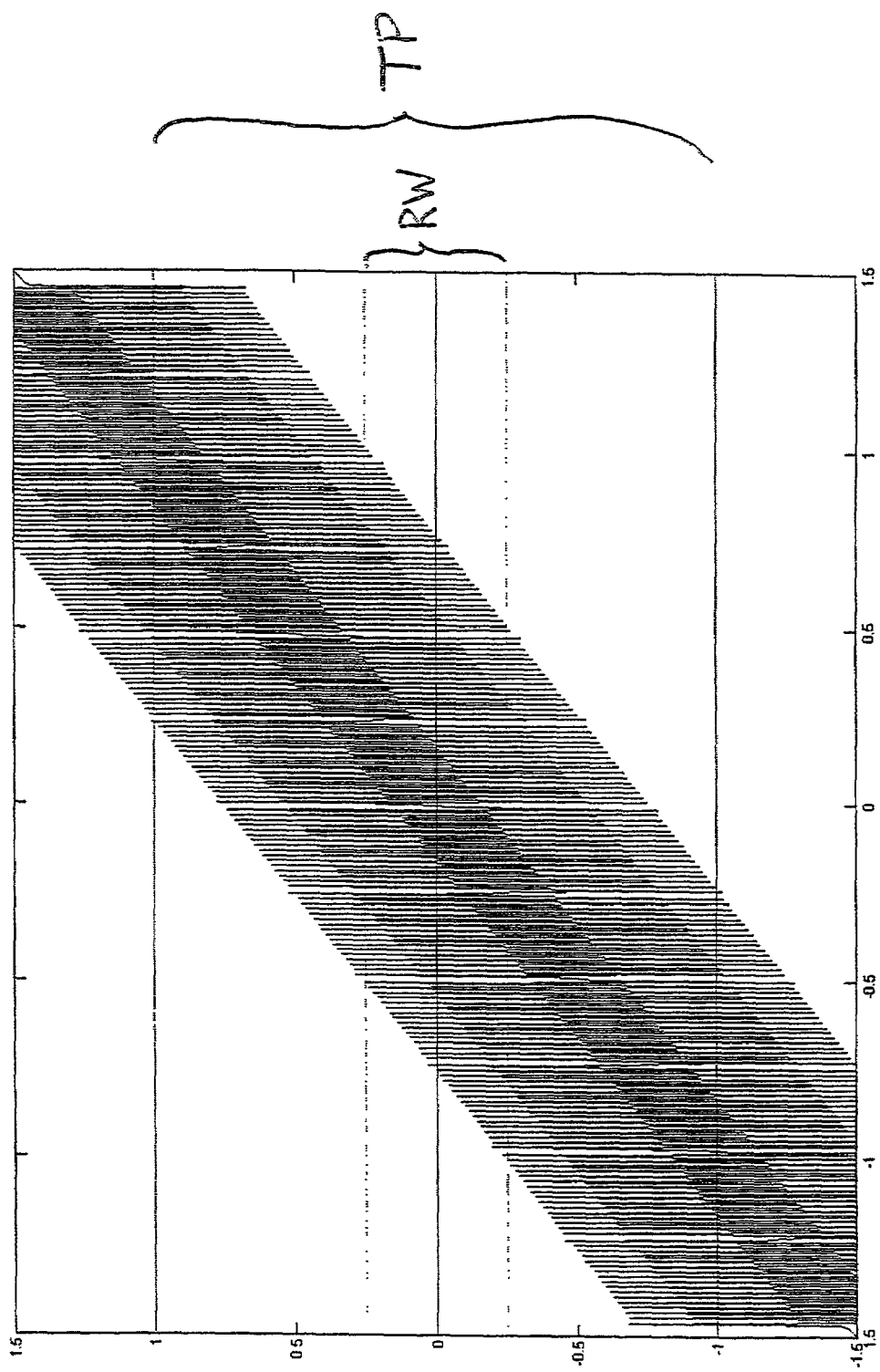
FIG. 10 is a diagrammatic representation of a magnified portion of one of the spirals of servo information shown in FIG. 9.

FIG. 10 is a diagrammatic representation of a magnified portion of one of the spirals of servo information shown in FIG. 9. FIG. 10 is intended to provide a representation of the track pitch (TP) and the reader width (RW), wherein the track pitch is the width of a data track. As shown in FIG. 10, regardless of the reader width (RW), the reader 230 will see the same pattern. Accordingly, reader and writer width dependencies are removed.

Figure 11:
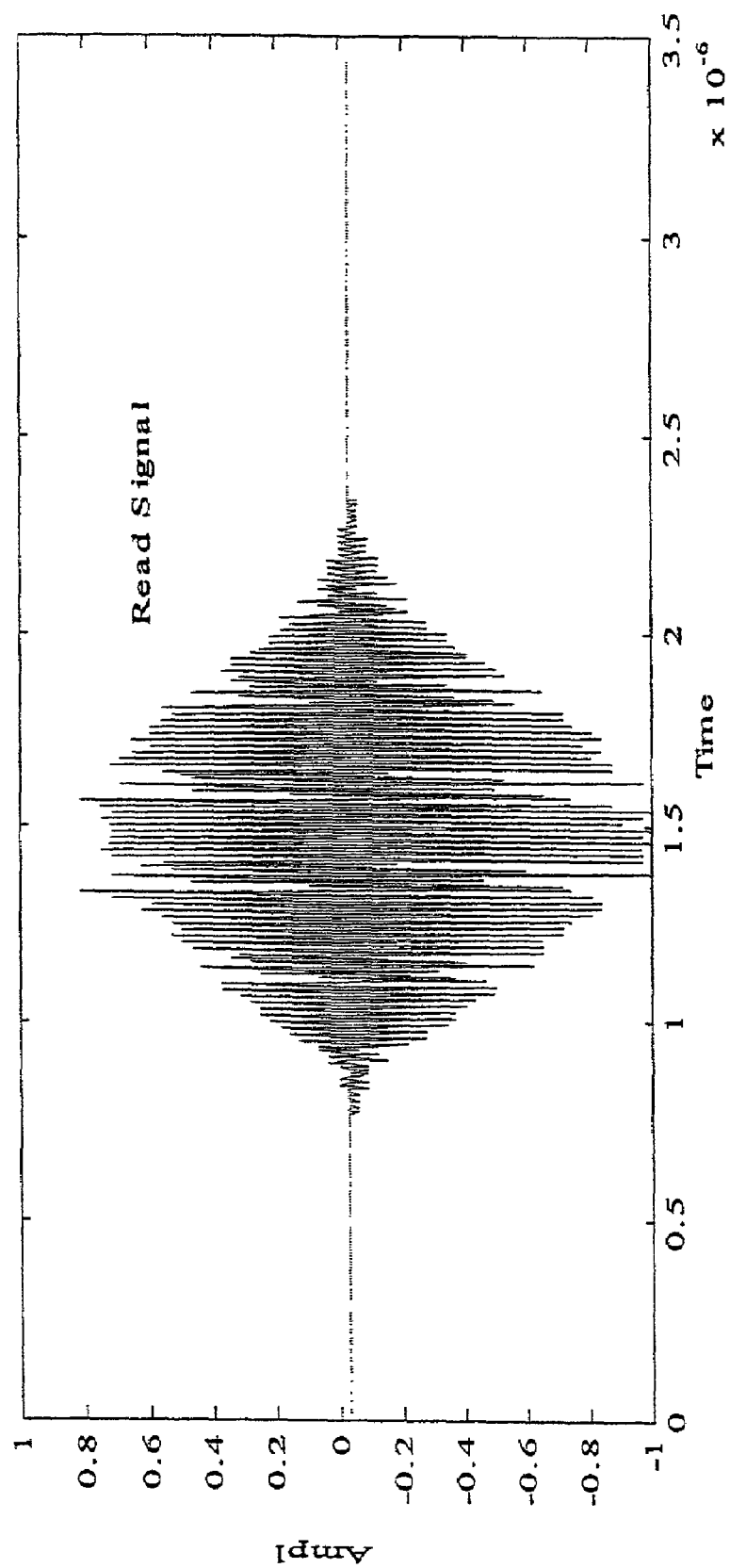
FIG. 11 is a diagrammatic representation of a read signal generated by the reader as the reader reads a portion of a spiral of servo information while the disk is spinning.

FIG. 11 is a diagrammatic representation of a read signal generated by the reader 230 as the reader 230 reads a portion of a spiral of servo information while the disk is spinning. In FIG. 11, the x-axis represents time, while the y-axis represents signal amplitude. The depicted shape is known herein as the read signal envelope.

Importantly, the position of the read signal envelope in time changes based upon the position of the reader 230. Although the read signal envelope moves relative to the position of the reader 230, the sync pattern within the spiral being read does not move. Accordingly, the envelope moves relative to the sync marks. Since the sync marks are at known radial positions, the sync marks provide a position reference for the reader 230.

As a convention, the position of the reader 230 is given by the centroid of the read signal envelope. For example, the centroid of the read signal envelope may be determined by integrating over the read signal envelope to determine its area and, then, dividing by two. It should be noted that other conventions may be adopted for the position of the reader 230.

Figure 12:
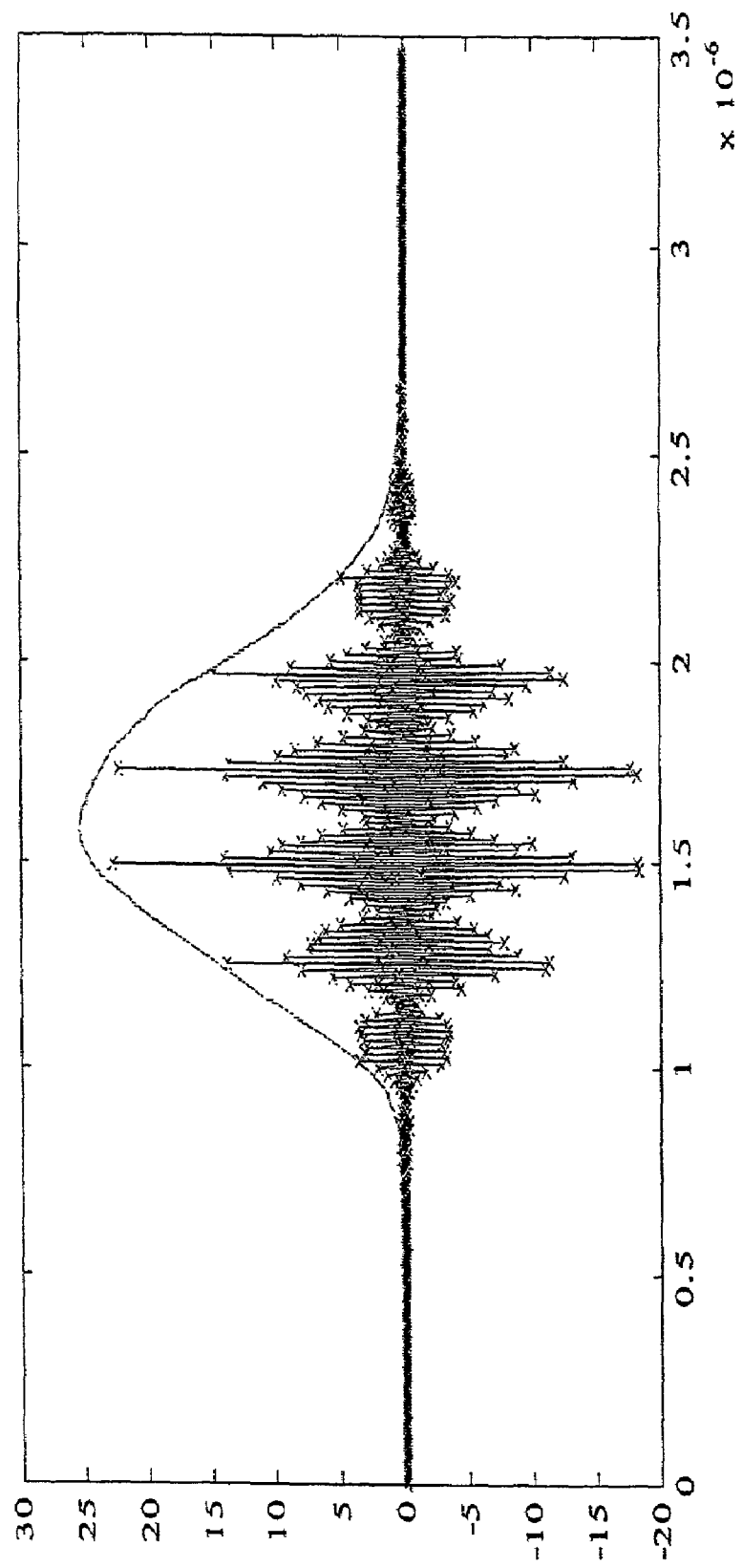
FIG. 12 is a diagrammatic representation of a read signal envelope which shows sync marks embedded in a read signal envelope.

FIG. 12 is a diagrammatic representation of a read signal envelope which shows sync marks embedded in a read signal envelope.

In U.S. patent application Ser. No. 09/853,093 and U.S. patent application Ser. No. 09/923,570, among other things, reference is made to following a constant velocity profile (e.g., moving the STW actuator arm at 10–20 inches per second) when writing spiral information. In writing spiral servo information in such a manner, the angle at which a spiral crosses generally circular tracks (hereinafter defined as the spiral crossing angle, $\gamma$) varies along the spiral. Accordingly, the shape of the read signal envelope (shown in FIG. 11) may vary from track-to-track. Specifically, the read signal envelope may appear "fatter" where the spiral crossing angle is smaller and may appear "thinner" where the spiral crossing angle is larger.

The inventors of the present invention have determined that the change in spiral crossing angle, $\gamma$, requires the use of dynamic gain adjustments in the disk drive's position demodulation algorithm. That is, read signal amplitudes associated with spiral servo information are track dependent, and therefore, require compensation.

In an effort to provide an alternative to compensating for changes in spiral crossing angle, $\gamma$, the inventors of the present invention have devised a method and apparatus for providing a constant spiral crossing angle by varying the velocity at which spiral information is written onto the disk surface. Accordingly, a system could be designed so that spiral crossing angles are constant for some or all tracks across a disk surface.

In order to derive a variable velocity profile which allows for constant spiral crossing angles, one must identify factors on which the spiral crossing angle depends. Changes in spiral crossing angle may be due to a number of different factors including: (1) the velocity at which a transducer writes servo information onto the disk surface; (2) the velocity of the disk at the particular radial location at which the servo information is being written; and, (3) skew angle.

Figure 13:
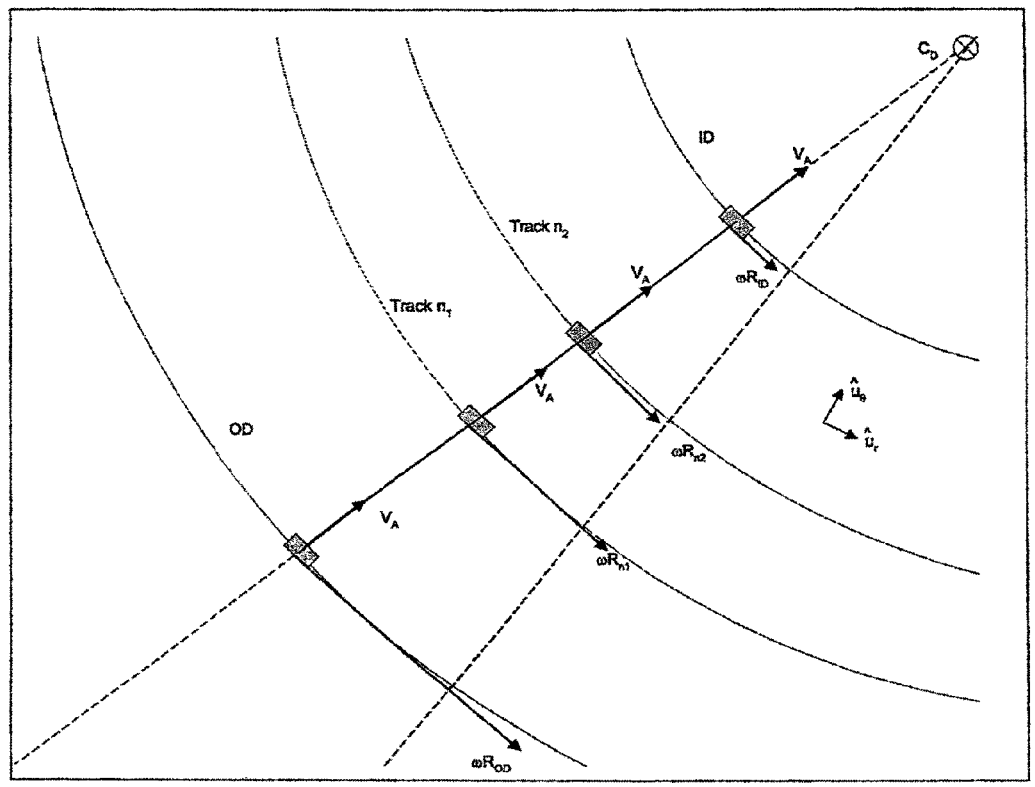
FIG. 13 is a diagrammatic representation of a disk surface illustrating spiral crossing angles while ignoring the effects of skew angle.

With reference to FIG. 13, the spiral crossing angle, $\gamma$, will be determined for a disk drive in which the transducer has no skew angle across the entire disk surface. As shown in FIG. 13, a writer moves at a linear velocity, $V_A$, along a radial line from the outer diameter (OD) of the disk towards the inner diameter (ID) of the disk. The linear velocity of the disk, $V_D$, is also shown in FIG. 13 and is equal to $\omega_D R$, where $\omega_D$ is the spin speed of the disk and R is the radial location of the writer. Thus, $V_D$ is proportional to the radial location of the writer. That is, the linear velocity of the disk, $V_D$, is greater at the outer diameter (OD) than it is at the inner diameter (ID).

Figure 14:
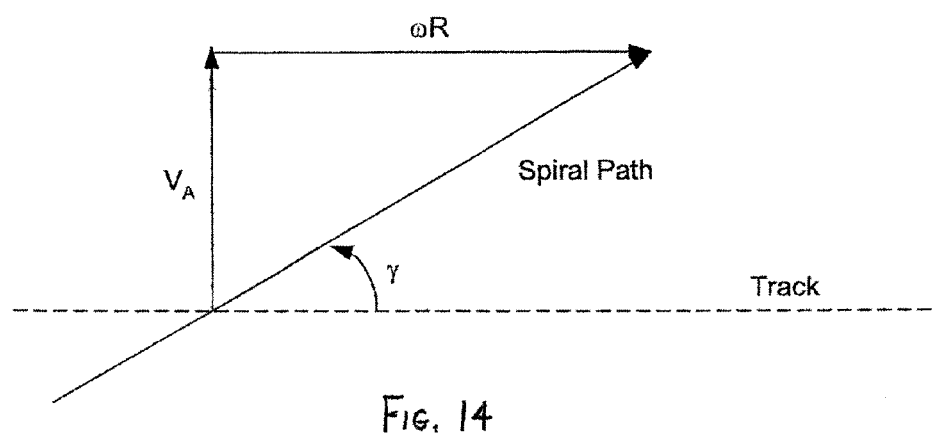
FIG. 14 is a diagrammatic representation to illustrate vector components of a spiral crossing angle.

As shown in FIG. 14, the actuator velocity, $V_A$, and the disk velocity, $\omega_D R$, determine the path of the spiral at any point. Using vector addition, the spiral path is $V_A + \omega_D R$. Thus, for a disk drive having no skew angle across the entire disk surface, the spiral crossing angle, $\gamma$, is given by the following equation:

$$\gamma = \arctan(V_A/\omega_D R) \qquad [1]$$

In order to keep the spiral crossing angle at a constant value, the above equation could be solved for $V_A$. It should be noted that the vectors shown in FIG. 13 are drawn with respect to a coordinate system fixed to, and rotating with, the disk.

Figure 15:
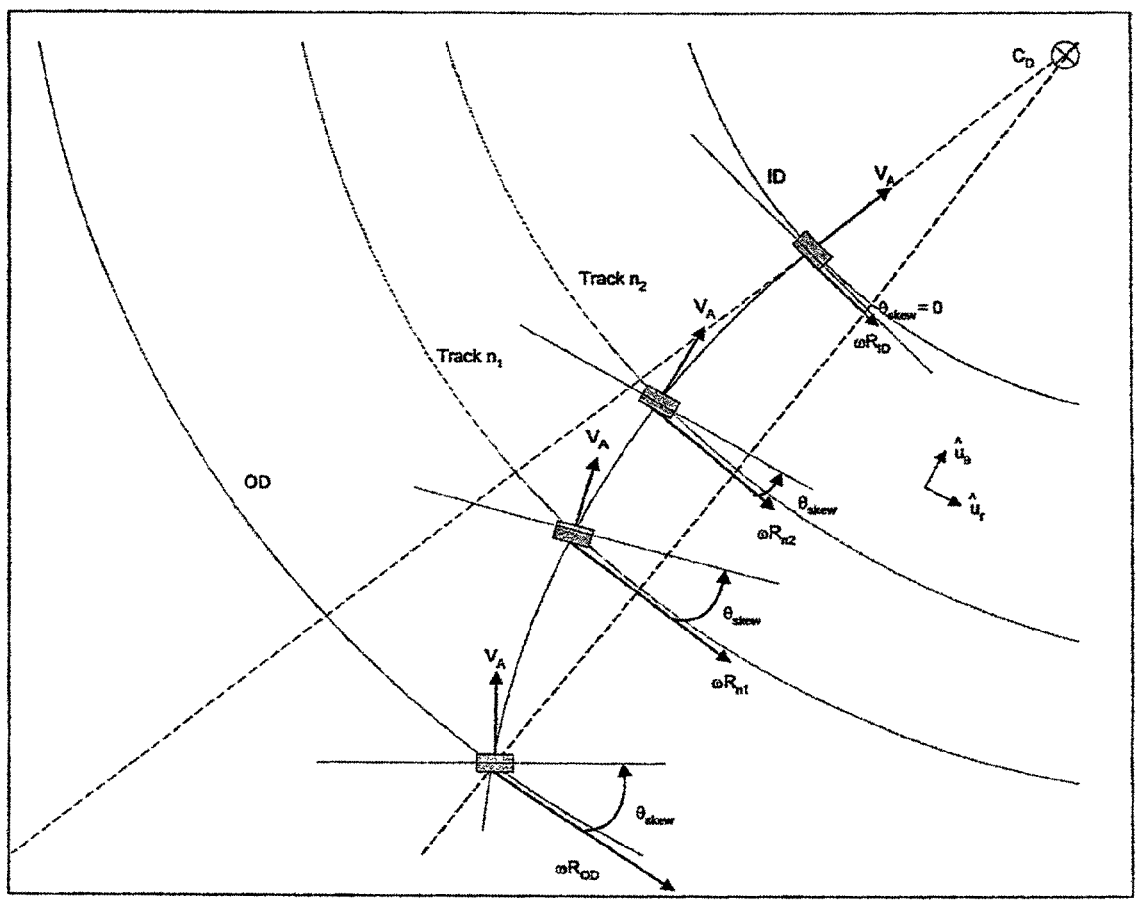
FIG. 15 is a diagrammatic representation of a disk surface illustrating spiral crossing angles while including the effects of skew angle.

In practice, disk drives do not have a zero skew angle across their entire disk surface. Like FIG. 13, FIG. 15 depicts movement of a writer from the disk's outer diameter (OD) to its inner diameter (ID). However, FIG. 15 also shows a skew angle, $\theta_{skew}$, which is zero at the disk's inner diameter and greatest at the disk's outer diameter.

Due to the skew angle, $\theta_{skew}$, a component of $V_A$ exists in the direction of the disk velocity $V_D$. Accordingly, for a disk drive that may include a skew angle, the spiral crossing angle, $\gamma$, is given by the following equation:

$$\gamma = \arctan(V_A \cos(\theta_{skew})/(\omega_D R - V_A \sin(\theta_{skew}))) \qquad [2]$$

While the skew angle, $\theta_{skew}$, is shown as being zero at the disk's inner diameter and greatest at the disk's outer diameter, the above equation is equally applicable to situations where the skew angle, $\theta_{skew}$, is zero at other locations.

Figure 16:
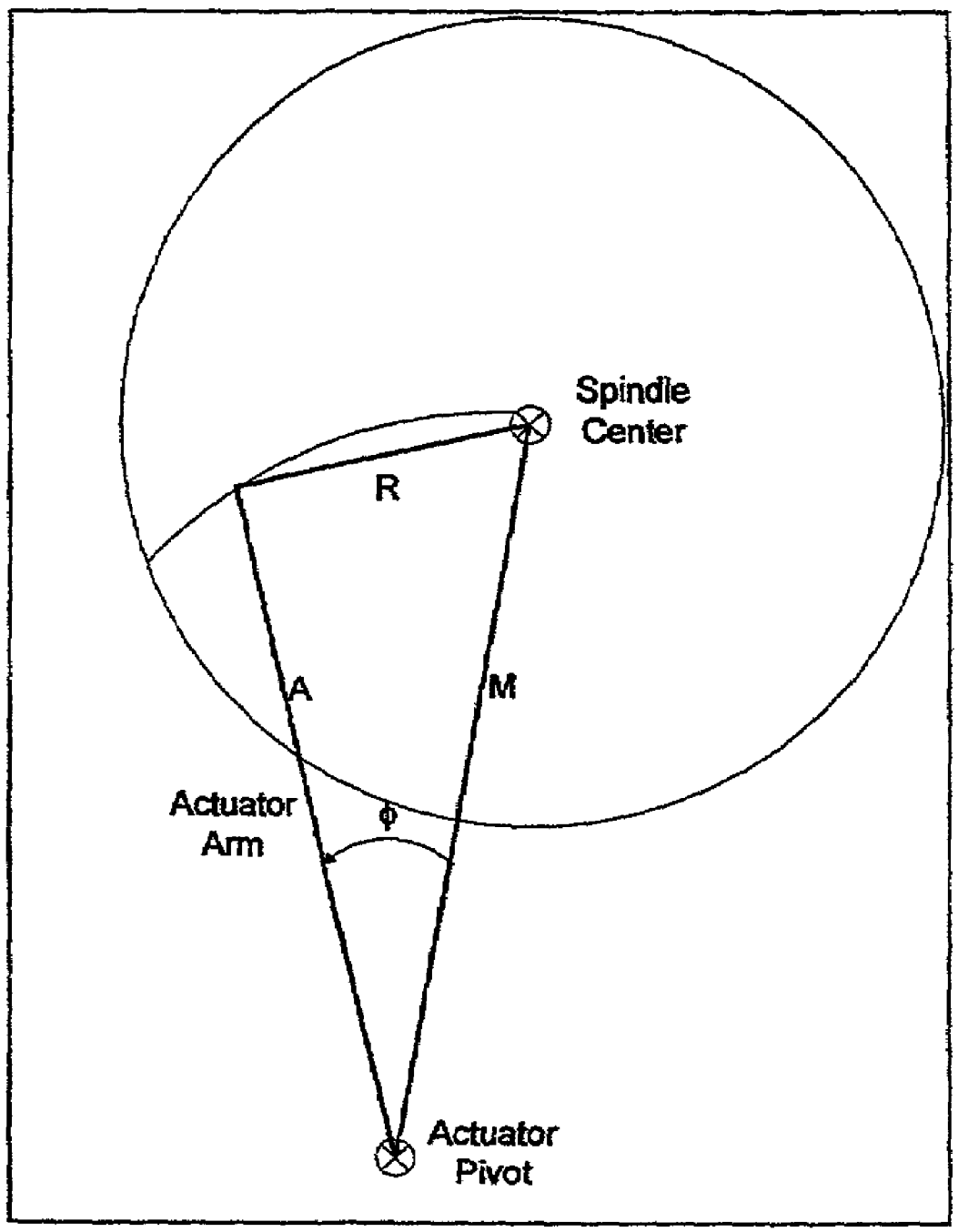
FIG. 16 is a simplified diagrammatic representation of a disk drive to illustrate the geometric relationship between actuator arm and disk surface.

In order to implement a profiled movement of the positioner on the STW, the linear velocity profile must be converted to the angular velocity of the positioner and then the desired position profile must be computed using the integral of the angular velocity. FIG. 16 shows the geometric relationship between the disk and the actuator. As shown in FIG. 16, A represents the actuator pivot to writer distance, R represents the track radial distance from spindle center, M represents the actuator pivot to spindle center distance and $\phi$ represents the actuator angle.

The radius as a function of actuator angle is given by the following equation:

$$R(\phi) = (A^2 + M^2 - 2AM\cos(\phi))^{1/2} \qquad [3]$$

The skew angle can be expressed as a function of actuator angle and is given by the following equation:

$$\theta_{skew}(\phi) = \arcsin((A^2 + R(\phi)^2 - M^2)/2AR(\phi)) \quad [4]$$

Substituting equations [3] and [4] into equation [2] allows the spiral crossing angle to be computed at any actuator position. An alternative formulation of equation [2] involves solving for $V_A$ as a function of $\phi$ and is given by the following equation:

$$V_A(\phi) = \tan(\gamma) w_D R(\phi)/(\tan(\gamma) \sin(\theta_{skew}(\phi)) + \cos(\theta_{skew}(\phi))) \quad [5]$$

By setting $\gamma$ to a constant, equation [5] can be used to compute the variable velocity profile.

Figure 17:
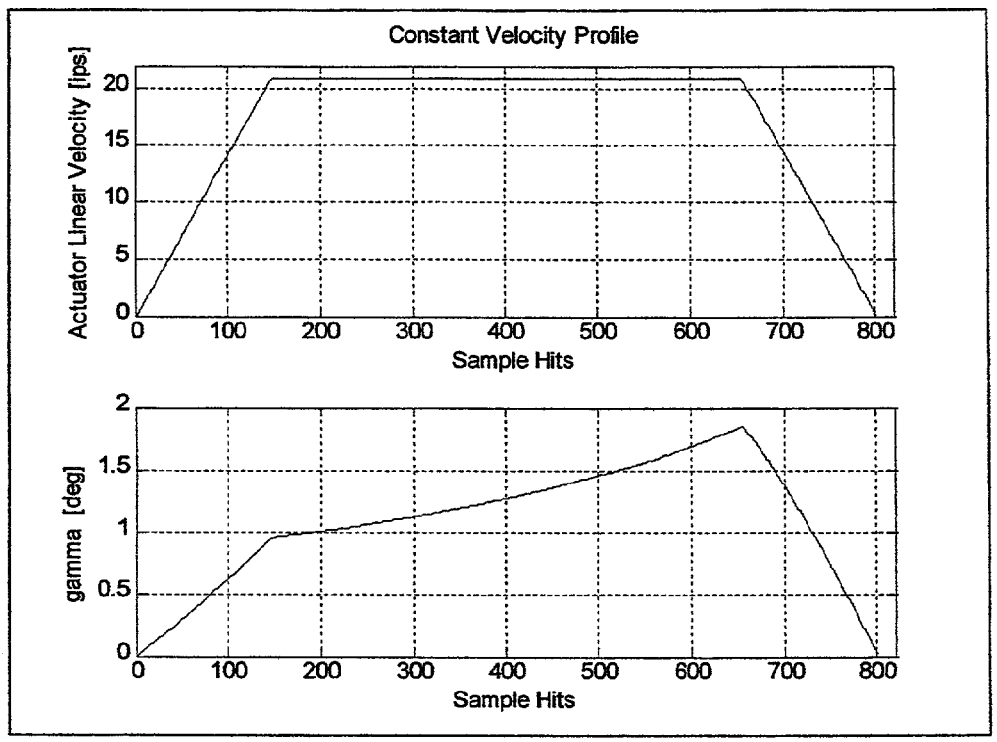
FIG. 17 is a graphical representation of both an exemplary constant velocity profile and corresponding skew angles; and, FIG. 18 is a graphical representation of both an exemplary variable velocity profile and corresponding constant skew angle.
Figure 18:
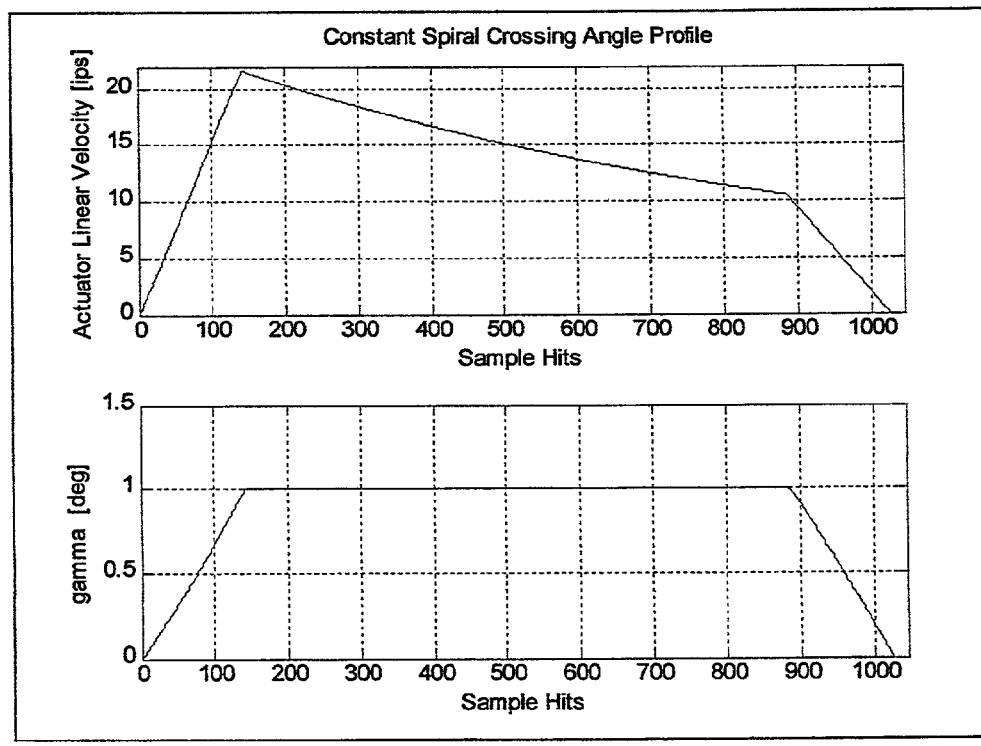

To contrast a constant velocity profile with a variable velocity profile, reference is made to FIGS. 17 and 18. The upper portion of FIG. 17 shows an exemplary constant velocity profile as a function of position control loop samples, while the lower portion of FIG. 17 corresponds with the upper portion of FIG. 17 and shows spiral crossing angle as a function of position control loop samples. As shown in FIG. 17, the spiral crossing angle varies by almost 1 degree over the constant velocity portion of the profile.

The lower portion of FIG. 18 shows a spiral crossing angle that has been set to equal a constant 1 degree. Using equation [5] and solving for $V_A$ with a spiral crossing angle equal to a constant 1 degree results in a variable velocity profile shown in the upper portion of FIG. 18.

It should be noted that the sharply angled portions near the left and right ends of FIGS. 17 and 18 correspond with non-useable areas of the disk surface (e.g., guard bands), but are greatly exaggerated in the figures.

It should also be noted that variable velocity profiles may also be used to purposefully change the number of tracks per inch (TPI) on the disk surface, since the velocity at which the spiral servo information is being written onto the disk surface is used to define the TPI. More specifically, as mentioned above, sync marks may be written at constant time intervals by the transducer. Furthermore, the sync marks are used to define the tracks (i.e., the track pitch). When the transducer is moving across the disk surface at a constant velocity over a region of the disk surface, the number of tracks per inch is constant over that region of the disk surface. If the transducer is moved across the disk surface at a variable velocity instead of a constant velocity, the number of tracks per inch will change across the disk surface in accordance with the varying velocity of the transducer.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
   providing a servo track writer having a servo track writer actuator arm which is coupled to a transducer that writes servo information onto a disk surface; and,
   moving the servo track writer actuator arm at a variable velocity, so that spiral servo information is written at the variable velocity across the disk surface, wherein the spiral servo information crosses tracks at spiral crossing angles and wherein the variable velocity is chosen such that the spiral crossing angles are constant for a group of tracks across the disk surface.

2. The method of claim 1, wherein the spiral crossing angles are constant for all tracks across the disk surface.

3. The method of claim 2, wherein the tracks are generally circular.

4. The method of claim 1, wherein the variable velocity, $V_A(\phi)$, equals $\tan(\gamma) w_D R(\phi)/(\tan(\gamma) \sin(\theta_{skew}(\phi)) + \cos(\theta_{skew}(\phi)))$, and wherein $\Theta_{skew}(\phi) = \arcsin((A^2 + R(\phi)^2 - M^2)/2AR(\phi))$, $R(\phi) = (A^2 + M^2 - 2AM\cos(\phi))^{1/2}$, A equals actuator pivot to transducer distance, M equals actuator pivot to spindle center distance and $\phi$ equals actuator angle.

5. The method of claim 1, wherein the tracks are generally circular.

6. The method of claim 1, wherein the spiral servo information includes a plurality of spirals.

7. The method of claim 6, wherein the plurality of spirals do not contact one another.

8. The method of claim 7, wherein the tracks are generally circular.

9. The method of claim 7, wherein the disk surface has an outer diameter and an inner diameter, and wherein the plurality of spirals extend from substantially the outer diameter to substantially the inner diameter.

10. The method of claim 6, wherein the tracks are generally circular.

11. A method comprising the steps of:
    providing a servo track writer having a servo track writer actuator arm which is coupled to a transducer that writes servo information onto a disk surface; and,
    moving the servo track writer actuator arm at a variable velocity, so that spiral servo information is written at the variable velocity across the disk surface, wherein the spiral servo information includes sync marks that are written at constant time intervals and wherein the sync marks define track pitch.

12. The method of claim 11, wherein the track pitch changes in accordance with the variable velocity of the servo track writer actuator arm.

13. An apparatus comprising:
    a disk drive having a disk surface and a transducer for writing spiral servo information onto the disk surface; and,
    a servo track writer coupled to the transducer, wherein the servo track writer causes the transducer to move at a variable velocity across the disk surface as the transducer writes spiral servo information onto the disk surface, wherein the spiral servo information crosses tracks at spiral crossing angles and wherein the variable velocity is chosen such that the spiral crossing angles are constant for a group of tracks across the disk surface.

14. The apparatus of claim 13, wherein the spiral crossing angles are constant for all tracks across the disk surface.

15. The apparatus of claim 14, wherein the tracks are generally circular.

16. The apparatus of claim 13, wherein the variable velocity, $V_A(\phi)$, equals $\tan(\gamma) w_D R(\phi)/(\tan(\gamma) \sin(\theta_{skew}(\phi)) + \cos(\theta_{skew}(\phi)))$, and wherein $\Theta_{skew}(\phi) = \arcsin((A^2 + R(\phi)^2 - M^2)/2AR(\phi))$, $R(\phi) = (A^2 + M^2 - 2AM\cos(\phi))^{1/2}$, A equals actuator pivot to transducer distance, M equals actuator pivot to spindle center distance and $\phi$ equals actuator angle.

17. The apparatus of claim 13, wherein the tracks are generally circular.

18. The apparatus of claim 13, wherein the spiral servo information includes a plurality of spirals.

19. The apparatus of claim 18, wherein the plurality of spirals do not contact one another.

20. The apparatus of claim 19, wherein the tracks are generally circular.

21. The apparatus of claim 19, wherein the disk surface has an outer diameter and an inner diameter, and wherein the plurality of spirals extend from substantially the outer diameter to substantially the inner diameter.

22. The apparatus of claim 18, wherein the tracks are generally circular.

23. An apparatus comprising:
a disk drive having a disk surface and a transducer for writing spiral servo information onto the disk surface; and,
a servo track writer coupled to the transducer, wherein the servo track writer causes the transducer to move at a variable velocity across the disk surface as the transducer writes spiral servo information onto the disk surface, wherein the spiral servo information includes sync marks that are written at constant time intervals and wherein the sync marks define track pitch.

24. The apparatus of claim 23, wherein the track pitch changes in accordance with the variable velocity of the transducer.

25. A disk drive comprising:
a disk surface having spiral servo information written thereon, wherein the spiral servo information crosses tracks at spiral crossing angles; and,
a transducer associated with the disk surface and which was used to write the spiral servo information, wherein the transducer was moved at a variable velocity while writing said spiral servo information so that the spiral crossing angles are constant for a group of tracks across the disk surface.

26. The disk drive of claim 25, wherein the spiral crossing angles are constant for all tracks across the disk surface.

27. The disk drive of claim 26, wherein the tracks are generally circular.

28. The disk drive of claim 25, wherein the variable velocity, $V_A(\phi)$, at which the transducer was moved, equals $\tan(\gamma) w_D R(\phi)/(\tan(\gamma)\sin(\theta_{skew}(\phi))+\cos(\theta_{skew}(\phi)))$, and wherein $\Theta_{skew}(\phi)=\arcsin((A^2+R(\phi)^2-M^2)/2AR(\phi))$, $R(\phi)=(A^2+M^2-2AM\cos(\phi))^{1/2}$, A equals actuator pivot to transducer distance, M equals actuator pivot to spindle center distance and $\phi$ equals actuator angle.

29. The disk drive of claim 25, wherein the tracks are generally circular.

30. The disk drive of claim 25, wherein the spiral servo information includes a plurality of spirals.

31. The disk drive of claim 30, wherein the plurality of spirals do not contact one another.

32. The disk drive of claim 30, wherein the tracks are generally circular.

33. The disk drive of claim 31, wherein the tracks are generally circular.

34. The disk drive of claim 31, wherein the disk surface has an outer diameter and an inner diameter, and wherein the plurality of spirals extend from substantially the outer diameter to substantially the inner diameter.

35. A disk drive comprising:
a disk surface having spiral servo information written thereon, wherein the spiral servo information includes sync marks that were written at constant time intervals and wherein the sync marks define track pitch across the disk surface; and,
a transducer associated with the disk surface and which was used to write the spiral servo information, wherein the transducer was moved at a variable velocity while writing said spiral servo information such that the track pitch changes in accordance with the variable velocity of the transducer.

36. A method comprising the steps of:
providing a servo track writer having a servo track writer actuator arm which is coupled to a transducer that writes servo information onto a disk surface; and,
moving the servo track writer actuator arm at a variable velocity, so that spiral servo information is written at the variable velocity across the disk surface, wherein generally concentric portions of the disk surface define tracks, wherein the spiral servo information crosses said tracks at spiral crossing angles and wherein the variable velocity is chosen such that the spiral crossing angles are constant for a group of tracks across the disk surface.

37. The method of claim 36, wherein the spiral crossing angles are constant for all tracks across the disk surface.

38. An apparatus comprising:
a disk drive having a disk surface and a transducer for writing spiral servo information onto the disk surface; and,
a servo track writer coupled to the transducer, wherein generally concentric portions of the disk surface define tracks, wherein the servo track writer causes the transducer to move at a variable velocity across the disk surface as the transducer writes spiral servo information onto the disk surface, wherein generally concentric portions of the disk surface define tracks, wherein the spiral servo information crosses tracks at spiral crossing angles and wherein the variable velocity is chosen such that the spiral crossing angles are constant for a group of tracks across the disk surface.

39. The apparatus of claim 38, wherein the spiral crossing angles are constant for all tracks across the disk surface.

40. A disk drive comprising:
a disk surface having spiral servo information written thereon, wherein generally concentric portions of the disk surface define tracks, wherein the spiral servo information crosses tracks at spiral crossing angles; and,
a transducer associated with the disk surface and which was used to write the spiral servo information, wherein the transducer was moved at a variable velocity while writing said spiral servo information so that the spiral crossing angles are constant for a group of tracks across the disk surface.

41. The disk drive of claim 40, wherein the spiral crossing angles are constant for all tracks across the disk surface.

42. A method comprising the steps of:
providing a servo track writer having a servo track writer actuator arm which is coupled to a transducer that writes servo information onto a disk surface; and,
moving the servo track writer actuator arm at a variable velocity, so that spiral servo information is written at the variable velocity across the disk surface, wherein the spiral servo information includes a plurality of spirals, wherein the plurality of spirals do not contact one another and wherein the plurality of spirals each extend between substantially an outer diameter of the disk surface and substantially an inner diameter of the disk surface.

43. An apparatus comprising:
a disk drive having a disk surface and a transducer for writing spiral servo information onto the disk surface; and, a servo track writer coupled to the transducer, wherein the servo track writer causes the transducer to move at a variable velocity across the disk surface as the transducer writes spiral servo information onto the disk surface, wherein the spiral servo information includes a plurality of spirals, wherein the plurality of spirals do not contact one another and wherein the plurality of spirals each extend between substantially an outer diameter of the disk surface and substantially an inner diameter of the disk surface.

* * * * *